(12) United States Patent
Massari et al.

(10) Patent No.: US 9,045,629 B2
(45) Date of Patent: *Jun. 2, 2015

(54) POLYOLEFINIC COMPOSITIONS HAVING GOOD WHITENING RESISTANCE

(75) Inventors: Paola Massari, Ferrara (IT); Marco Ciarafoni, Ferrara (IT); Jean News, Newark, DE (US)

(73) Assignee: Basell Poliolefine Italia S.r.l., Milan (IT)

( * ) Notice: Subject to any disclaimer, the term of this patent is extended or adjusted under 35 U.S.C. 154(b) by 882 days.

This patent is subject to a terminal disclaimer.

(21) Appl. No.: 11/921,097

(22) PCT Filed: May 5, 2006

(86) PCT No.: PCT/EP2006/062094
§ 371 (c)(1),
(2), (4) Date: Nov. 27, 2007

(87) PCT Pub. No.: WO2006/125720
PCT Pub. Date: Nov. 30, 2006

(65) Prior Publication Data
US 2009/0253868 A1    Oct. 8, 2009

Related U.S. Application Data

(60) Provisional application No. 60/686,373, filed on Jun. 1, 2005.

(30) Foreign Application Priority Data

May 27, 2005 (EP) .................... 05104554

(51) Int. Cl.
| C08L 23/00 | (2006.01) |
| C08L 23/04 | (2006.01) |
| C08L 23/10 | (2006.01) |
| C08L 23/14 | (2006.01) |

(52) U.S. Cl.
CPC .................. C08L 23/10 (2013.01); C08L 23/14 (2013.01); C08L 2205/03 (2013.01)

(58) Field of Classification Search
CPC ...... C08L 23/10; C08L 23/14; C08L 2205/03
USPC ....................................................... 525/240
See application file for complete search history.

(56) References Cited

U.S. PATENT DOCUMENTS

| 4,245,062 A | 1/1981 | Suzuki et al. |
| 4,298,718 A | 11/1981 | Mayr et al. |
| 4,395,519 A * | 7/1983 | Minami et al. ................. 525/240 |
| 4,399,054 A | 8/1983 | Ferraris et al. |
| 4,469,648 A | 9/1984 | Ferraris et al. |
| 4,472,524 A | 9/1984 | Albizzati |
| 4,473,687 A * | 9/1984 | Dorrer et al. ................... 525/240 |
| 4,495,338 A | 1/1985 | Mayr et al. |
| 4,521,566 A | 6/1985 | Galli et al. |
| 4,522,930 A | 6/1985 | Albizzati et al. |
| 4,582,878 A * | 4/1986 | Chiba et al. .................... 525/268 |
| 4,734,459 A | 3/1988 | Cecchin et al. |
| 5,326,639 A * | 7/1994 | Leonard et al. ................ 428/402 |
| 5,468,809 A * | 11/1995 | Ghisellini et al. ............. 525/240 |
| 5,541,260 A * | 7/1996 | Pelliconi et al. ............... 525/240 |
| 6,716,939 B2 | 4/2004 | Morini et al. |
| 6,818,583 B1 | 11/2004 | Morini et al. |
| 7,649,052 B2 * | 1/2010 | Massari et al. ................. 525/240 |
| 7,872,074 B2 * | 1/2011 | Massari et al. ................. 525/191 |
| 2005/0032633 A1* | 2/2005 | Morini et al. ................. 502/118 |
| 2007/0010625 A1* | 1/2007 | News et al. .................... 525/240 |
| 2008/0167428 A1* | 7/2008 | Massari et al. ................. 525/240 |

FOREIGN PATENT DOCUMENTS

| EP | 45977 | 2/1982 |
| EP | 86300 | 8/1983 |
| EP | 361493 | 4/1990 |
| EP | 728769 | 8/1996 |
| EP | 903356 | 3/1999 |
| EP | 444671 | 9/2001 |
| GB | 1065568 | 4/1967 |
| JP | 58 152038 | 9/1983 |
| RU | 2083611 C1 | 7/1997 |
| RU | 2006145445 A | 6/2008 |
| WO | WO 00/63261 | 10/2000 |
| WO | WO 01/57099 | 8/2001 |
| WO | WO-2005113672 A1 | 12/2005 |
| WO | WO 2006/067023 | 6/2006 |

OTHER PUBLICATIONS

Y. Inoue et al., "Studies of the stereospecific polymerization mechanism of propylene by a modified Ziegler-Natta catalyst based on 125 MHz $^{13}$C n.m.r. spectra," *Polymer*, vol. 25, p. 1640-1644 (1984).

R. Chûjô et al., "Two-site model analysis of $^{13}$C n.m.r. of polypropylene polymerized by Ziegler-Natta catalyst with external alkoxysilane donors," *Polymer*, vol. 35(2), p. 339-342 (1994).

* cited by examiner

Primary Examiner — Irina Krylova

(57) ABSTRACT

A polypropylene composition comprising 65-77 wt % of a crystalline propylene polymer, 8 to less than 13 wt % of an elastomeric copolymer and 10-23 wt % of polyethylene. The said composition exhibits a flexural modulus value higher than 1300 MPa, stress-whitening resistance values corresponding to a diameter of the whitened area of at most 1.7 cm caused by a ram falling from a 76 cm height and a diameter of the whitened area of at most 1.2 cm caused by a ram falling from a 20 cm height, and a value of Izod impact resistance at 23° C. more than 14 kJ/m2 and the one at −20° C. at least 5 kJ/m2.

5 Claims, No Drawings

POLYOLEFINIC COMPOSITIONS HAVING GOOD WHITENING RESISTANCE

The present invention relates to polyolefin compositions having a good balance of mechanical properties and a process to prepare said compositions. In particular, the compositions exhibit good stiffness, impact resistance and stress-whitening resistance.

The polyolefin compositions according to the present invention find application in articles prepared by injection moulding, such as battery cases and house ware, and thermoforming processes.

As is known, the isotactic polypropylene, though being endowed with an exceptional combination of excellent properties, is affected by the drawback of possessing an insufficient impact resistance at relatively low temperatures.

According to the teaching of the prior art, it is possible to obviate the said drawback and maintain whitening resistance, without sensibly affecting the other polymer properties, by properly adding rubbers and polyethylene to the polypropylene.

European patent application 86300 relates to so called "impact polypropylene compositions" and discloses polypropylene block copolymers having improved impact resistance and high stiffness.

U.S. Pat. No. 4,521,566 discloses polypropylene compositions comprising a crystalline propylene polymer, an amorphous copolymeric fraction and an ethylene-propylene crystalline copolymeric fraction. The disclosed compositions exhibit high stiffness and good impact resistance. However, as exemplified in the examples the said compositions have the drawback of possessing low impact resistance at ambient temperature when the composition is quite stiffness; an increase of impact resistance involves a decrease of stiffness.

In U.S. Pat. No. 4,734,459 a polypropylene composition having good whitening resistance is disclosed. According to the teaching of the said prior art document, it is possible to improve whitening resistance by replacing the ethylene-propylene copolymer rubber with an ethylene-butene-1 copolymer rubber.

It has now surprisingly been found that it is possible to obtain polypropylene compositions endowed with high impact resistance even at low temperatures and good whitening resistance in spite of the fact they exhibit rather high stiffness.

The said balance of properties is achieved by producing a polypropylene composition having specific polymer components exhibiting specific characteristics and in specific ratios.

Thus, an embodiment of the present invention consists of a polypropylene composition comprising (percent by weight):

a) 65-77%, preferably 70 to 77%, of a crystalline propylene polymer having an amount of isotactic pentads (mmmm), measured by $^{13}$C-MNR on the fraction insoluble in xylene at 25° C., higher than 97.5 molar % and a polydispersity index ranging from 5 to 10;

b) 8 to less than 13%, preferably 9 to 12%, of an elastomeric copolymer of ethylene and propylene, the copolymer having an amount of recurring units deriving from ethylene ranging from 30 to 70%, preferably 35 to 60%, and being partially soluble in xylene at ambient temperature; the polymer fraction soluble in xylene at ambient temperature having an intrinsic viscosity value ranging from 2 to 4 dl/g; and c) 10-23%, preferably 10 to 20%, of polyethylene having an intrinsic viscosity value ranging from 1.5 to 4 dl/g and optionally containing recurring units derived from propylene in amounts lower than 10%.

The term "copolymer" as used herein refers to both polymers with two different recurring units and polymer with more than two different recurring units, such as terpolymers, in the chain.

Typically the composition has a content of component (b) plus component (c) in amounts of at least 18 wt %, preferably higher than 25 wt %, and the total content of copolymerized ethylene of at least 12 wt %, preferably equal to or higher than 18 wt %, more preferably at least 20 wt %.

The composition typically has a value of melt flow rate ranging from 0.50 to 10 g/10 min, preferably 0.10 to 5 g/10 min, more preferably 1.3 to 4 g/10 min.

The composition has typically an amount of polyethylene (c) equal to or higher than elastomeric copolymer (b), preferably the weight ratio between polyethylene (c) and copolymer (b) is at least 1.4.

Typically, the composition of the present invention exhibits a flexural modulus value at least 1300 MPa, preferably higher than 1350 MPa, such as from 1400 to 1600 MPa, stress-whitening resistance values corresponding to a diameter of the whitened area of at most 1.7 cm caused by a ram falling from a 76 cm height and a diameter of the whitened area of at most 1.2 cm caused by a ram falling from a 20 cm height, a value of Izod impact resistance at 23° C. more than 14 kJ/m$^2$, preferably more than 30 kJ/m$^2$, and the one at −20° C. at least 5 kJ/m$^2$, preferably more than 6.5 kJ/m$^2$, more preferably 7.5 kJ/m$^2$ or higher.

Crystalline propylene polymer (a) is selected from a propylene homopolymer and a copolymer of propylene containing at most 3 wt % of ethylene or a $C_4$-$C_{10}$ α-olefin or combination thereof. Particularly preferred is the propylene homopolymer.

Typically crystalline propylene polymer (a) shows a molecular weight distribution, expressed by the ratio between the weight average molecular weight and numeric average molecular weight, i.e. $\overline{M}_w/\overline{M}_n$, measured by GPC, equal to or higher than 7.5, in particular from 8 to 20. The melt flow rate of crystalline propylene polymer (a) typically ranges from 1 to 60 g/10 min.

Typically crystalline propylene polymer (a) shows a value of z average molecular weight to numeric average molecular weight ratio, i.e. $\overline{M}_z/\overline{M}_w$, measured by GPC, of at least 3.5, preferably 4, more preferably 5, for example from 9 to 10.

Elastomeric ethylene-propylene copolymer (b) can optionally comprise a diene. When present, the diene is typically in amounts ranging from 0.5 to 10 wt % with respect to the weight of copolymer (b). The diene can be conjugated or not and is selected from butadiene, 1,4-hexadiene, 1,5-hexadiene, and ethylidene-norbornene-1, for example.

Copolymer (b) exhibits a fraction insoluble in xylene at ambient temperature that is typically in amounts less than 45 wt %, preferably equal to or lower than 25 wt %. The xylene-insoluble polymer fraction of copolymer (b) is reach in ethylene; the amount of ethylene is typically higher than 55 wt %.

Polyethylene (c) is crystalline or semicrystalline and is selected from ethylene homopolymer or an ethylene-propylene copolymer having the average content of the comonomer in amounts lower than 10 wt %. The intrinsic viscosity values of copolymer (c) are preferably within the range from 2.0-3.5 dl/g.

The composition of the present invention is obtained by means of a sequential copolymerization process.

Therefore, the present invention is further directed to a process for the preparation of the polyolefin compositions as reported above, said process comprising at least three sequential polymerization stages with each subsequent polymerization being conducted in the presence of the polymeric material formed in the immediately preceding polymerization reaction, wherein the polymerization stage of propylene to the crystalline polymer (a) is carried out in at least one stage, than a copolymerization stage of mixtures of ethylene with propylene (and optionally a diene) to elastomeric polymer (b) and finally a polymerization stage of ethylene to polyethylene (c) are carried out. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:

a) Mg, Ti and halogen and an electron donor (internal donor), b) an alkylaluminum compound and, optionally (but preferably), c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

Among succinates, they are preferably selected from succinates of formula (I) below:

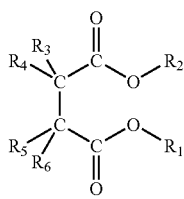

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$, equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms;

or of formula (II) below:

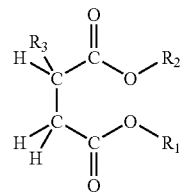

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

External donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

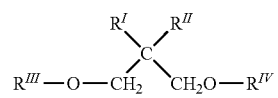

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are $C_1$-$C_{18}$ hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$ and (cyclopentyl)$_2$Si(OCH$_3$)$_2$.

Preferably electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond, and the above mentioned electron donor compounds supported on a Mg halide. The magnesium halide is preferably $MgCl_2$ in active form, which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula Ti(OR)n-yXy can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably $TiCl_4$, with a magnesium chloride deriving from an adduct of formula $MgCl_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. Nos. 4,399,054 and 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound(s) can be added during the treatment with $TiCl_4$.

Regardless of the preparation method used, the final amount of the electron donor compound(s) is preferably such that the molar ratio with respect to the $MgCl_2$ is from 0.01 to 1, more preferably from 0.05 to 0.5.

The said catalyst components and catalysts are described in WO 00/63261 and WO 01/57099.

The catalysts may be precontacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

The polymerisation stages may occur in liquid phase, in gas phase or liquid-gas phase. Preferably, the polymerisation of crystalline polymer (a) is carried out in liquid monomer (e.g. using liquid propylene as diluent), while the copolymerisation stages of elastomeric copolymer (b) and polyethylene (c) are carried out in gas phase. Alternatively, all the three sequential polymerisation stages can be carried out in gas phase.

The reaction temperature in the polymerisation stage for the preparation of crystalline polymer (a) and in the preparation of elastomeric copolymer (b) and polyethylene (c) be the same or different, and is preferably from 40 to 100° C.; more preferably, the reaction temperature ranges from 50 to 80° C. in the preparation of polymer (a), and from 70 to 100° C. for the preparation of polymer components (b) and (c).

The pressure of the polymerisation stage to prepare polymer (a), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the two stages depend on the desired ratio between polymers (a) and (b) and (c), and can usually range from 15 minutes to 8 hours. Conventional molecular weight regulators known in the art, such as chain transfer agents (e.g. hydrogen or $ZnEt_2$), may be used.

Conventional additives, fillers and pigments, commonly used in olefin polymers, may be added, such as nucleating agents, extension oils, mineral fillers, and other organic and inorganic pigments. In particular, the addition of inorganic fillers, such as talc, calcium carbonate and mineral fillers, also brings about an improvement to some mechanical properties, such as flexural modulus and HDT. Talc can also have a nucleating effect.

The nucleating agents are added to the compositions of the present invention in quantities ranging from 0.05 to 2% by weight, more preferably from 0.1 to 1% by weight, with respect to the total weight, for example.

The particulars are given in the following examples, which are given to illustrate, without limiting, the present invention.

The following analytical methods have been used to determine the properties reported in the detailed description and in the examples.

Ethylene: By IR spectroscopy.
Fractions soluble and insoluble in xylene at 25° C.: 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

Intrinsic Viscosity [η]: Measured in tetrahydronaphthalene at 135° C.

Molecular weight ($\overline{M}_n$, $\overline{M}_w$, $\overline{M}_z$): Measured by way of gel permeation chromatography (GPC) in 1,2,4-trichlorobenzene.

Determination of isotactic pentads content: 50 mg of each xylene insoluble fraction were dissolved in 0.5 mL of $C_2D_2Cl_4$.

The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (Polymer, 1984, 25, 1640, by Inoue Y. et Al. and Polymer, 1994, 35, 339, by Chujo R. et Al.).

Polydispersity index: Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

This method is used for polymers having an MFR value of 20 g/10 min or less.

Polydispersity index: Measurement of molecular weight distribution of the polymer. To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI=54.6\times(\text{modulus separation})^{-1.76}$$

wherein the modulus separation (MS) is defined as:

$$MS=(\text{frequency at } G'=500 \text{ Pa})/(\text{frequency at } G''=500 \text{ Pa})$$

wherein G' is the storage modulus and G" is the loss modulus.

This method is used for polymers having an MFR value over 20 g/10 min.

Melt flow rate: Determined according to ISO method 1133 (230° C. and 2.16 kg).

Flexural modulus: Determined according to ISO method 178.

Izod impact resistance: Determined according to ISO method 180/1A.

Stress-whitening resistance: The resistance to whitening is determined by subjecting to the impact of a ram having a 76 g weight small discs, which have a 4 cm diameter and prepared by injection moulding, prepared from the polymer being tested. Both the minimum height (h) up to the maximum height allowed by the apparatus necessary to obtain whitening, and the width (diameter) of the whitened area are recorded.

EXAMPLES 1 AND 2

In a plant operating continuously according to the mixed liquid-gas polymerization technique, runs were carried out under the conditions specified in Table 1.

The polymerization was carried out in the presence of a catalyst system in a series of three reactors equipped with devices to transfer the product from one reactor to the one immediately next to it.

Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2.1.9C_2H_5OH$ (prepared according to the method described in ex.2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

Catalyst System and Prepolymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to prepolymerization by maintaining it in suspension in liquid propylene at 20° C. for about 5 minutes before introducing it into the first polymerization reactor.

Polymerization

The polymerisation run is conducted in continuous in a series of three reactors equipped with devices to transfer the product from one reactor to the one immediately next to it. The first reactor is a liquid phase reactor, and the second and third reactors are fluid bed gas phase reactors. Polymer (a) is prepared in the first reactor, while polymers (b) and (c) are prepared in the second and third reactor, respectively.

Temperature and pressure are maintained constant throughout the course of the reaction. Hydrogen is used as molecular weight regulator.

The gas phase (propylene, ethylene and hydrogen) is continuously analysed via gas-chromatography.

At the end of the run the powder is discharged and dried under a nitrogen flow.

Then the polymer particles are introduced in a twin screw extruder (Werner-type extruder), wherein they are mixed with 635 ppm of Irganox 1010, 635 ppm of Irgafos 168, 2450 ppm of distearyl thio-diproprionate and 270 ppm of synthetic hydrotalcite. The previously said Irganox 1010 is pentaerytrityl tetrakis 3-(3,5-di-tert-butyl-4-hydroxyphenyl)propanoate, while Irgafos 168 is tris(2,4-di-tert-butylphenyl) phosphite, both marketed by Ciba-Geigy. The polymer particles are extruded under nitrogen atmosphere in a twin screw extruder, at a rotation speed of 250 rpm and a melt temperature of 200-250° C.

COMPARATIVE EXAMPLE 1 (1c)

Example 1 was repeated except that the catalyst component was replaced with a catalyst component containing diisobutylphthahlate in the place of diethyl 2,3-(diisopropyl)succinate.

TABLE 1

Polymerization Process

| Example | 1 | 2 | 1c |
|---|---|---|---|
| TEAL/DCPMS weight ratio | 2.8 | 3.4 | 3 |
| 1st liquid phase reactor | | | |
| Polymerisation temperature, ° C. | 75 | 75 | 75 |
| Pressure, bar | 40 | 40 | 40 |
| H$_2$ bulk, mol ppm | 2800 | 2800 | 1300 |
| 2nd liquid phase reactor | | | |
| Polymerisation temperature, ° C. | — | — | 75 |
| Pressure, bar | — | — | 40 |
| H$_2$ bulk, mol ppm | — | — | 1300 |
| 1st gas phase reactor | | | |
| Polymerisation temperature, ° C. | 65 | 65 | 60 |
| Pressure, bar | 13 | 13 | 11.5 |
| C$_2^-$/(C$_2^-$ + C$_3^-$), % | 30 | 36 | 48 |
| H$_2$/C$_2^-$, % | 5.2 | 5.1 | 7.5 |
| 2ns gas phase reactor | | | |
| Polymerisation temperature, ° C. | 75 | 75 | 75 |
| Pressure, bar | 18 | 18 | 11.4 |
| C$_2^-$/(C$_2^-$ + C$_3^-$), % | 99.0 | 99.0 | 96.5 |
| H$_2$/C$_2^-$, % | 18.0 | 18.0 | 14.9 |

Notes:
H$_2$ bulk = hydrogen concentration in the liquid monomer; C$_2^-$ = ethylene; C$_3^-$ = propylene.

TABLE 2

Composition Analysis

| Example | 1 | 2 | 1c |
|---|---|---|---|
| Crystalline propylene homopolymer | | | |
| Homopolymer content, wt % | 71.5 | 72.5 | 76 |
| MFR, g/10 min | 5 | 5 | 3 |
| Polydispersity Index | 5.9 | 5.9 | 4.3 |
| $\overline{M}_w/\overline{M}_n$ ratio | 8.1 | 8.1 | 6.6 |
| $\overline{M}_z/\overline{M}_w$ ratio | 4.1 | 4.1 | 3.9 |
| Pentad content, molar % | 98.5 | 98.5 | 98.8 |
| Xylene soluble fraction, wt % | 1.6 | 1.6 | 1.3 |
| Proylene-ethylene copolymer | | | |
| Copolymer content, wt % | 10.5 | 10.5 | 8 |
| Ethylene content in EPR, wt % | 45 | 55 | 46 |
| Intrinsic viscosity [η] of the xylene-soluble fraction, dl/g | 3.7 | 3.6 | 3.5 |
| Xylene-soluble fraction, wt % | 11[1] | 10.5[1] | 9[1] |
| Polyethylene | | | |
| Polyethylene content, wt % | 18 | 17 | 16 |
| Ethylene content in PE, wt % | 100 | 100 | 100 |
| Intrinsic viscosity [η], dl/g | 2.7 | 2.7 | 3.31 |

Notes:
EPR: elastomeric ethylene-propylene copolymer rubber; PE: crystalline polyethylene.
[1]Value measured on the polymer composition produced in the first and second reactor.

The features of the final compositions and the properties of the whole compositions are recorded in Tables 3 and 4, respectively.

TABLE 3

Final Compositions

| Example | 1 | 2 | 1c |
|---|---|---|---|
| Ethylene content, wt % | 23 | 22.4 | 23 |
| Xylene-soluble fraction, wt % | 11 | 10.5 | 9 |
| Intrinsic viscosity [η] of the xylene-soluble fraction, dl/g | 3.7 | 3.6 | 3.5 |
| PE/EPR weight ratio | 1.71 | 1.62 | 2.00 |

TABLE 4

Properties of the Whole Compositions

| Examples and comparative examples | | 1 | 2 | 1c |
|---|---|---|---|---|
| MFR, g/10 min | | 1.6 | 2.0 | 2 |
| Flexural Modulus, MPa | | 1420 | 1370 | 1260 |
| Izod impact resistance, kJ/m$^2$ | at 23° C. | NB[1] | NB[1] | NB[1] |
| | at −20° C. | 10.6 | 8.5 | 6.0 |
| Whitening resistance: diameter (cm) of the whitening area due to a ram falling from a | 5 cm height | 0.7 | 0.4 | 0.3 |
| | 10 cm height | 1.0 | 0.7 | 0.6 |
| | 20 cm height | 1.1 | 0.9 | 0.9 |
| | 30 cm height | 1.3 | 1.1 | 1.0 |
| | 76 cm height | 1.4 | 1.3 | 1.9 |

[1]NB: not broken

The above data show that the polymer compositions according to the present invention exhibit an improved balance between stiffness and impact resistance, in particular at low temperatures both stiffness and impact resistance are higher; the whitening resistance is also improved for tests where the ram falls from a higher height and is substantially the same for tests where the ram falls from a lower height.

The invention claimed is:

1. A polypropylene composition comprising, percent by weight:
    a) 70 to 77 wt. % of a crystalline propylene polymer comprising an amount of isotactic pentads (mmmm) higher than 97.5 molar %, measured by $^{13}$C-NMR using a fraction insoluble in xylene at 25° C., and having a polydispersity index ranging from 5 to 10;
    b) 9 to 12 wt. % of an elastomeric copolymer of ethylene and propylene, wherein the elastomeric copolymer of ethylene and propylene has:
        (i) an ethylene content ranging from 30 to 70%, and
        (ii) the polymer fraction soluble in xylene at ambient temperature has an intrinsic viscosity value ranging from 3.5 to 4 dl/g; and
    c) 16 to 20 wt % of a polyethylene homopolymer comprising an intrinsic viscosity value ranging from 2.0 to 2.7 dl/g;
    wherein the polypropylene composition has:
    (i) a flexural modulus value ranging from 1400 to 1600 MPa, according to ISO method 178;
    (ii) a stress-whitening resistance values corresponding to a diameter of a whitened area of at most 1.7 cm caused by a ram falling from a 76 cm height, and a diameter of a whitened area of at most 1.2 cm caused by a ram falling from a 20 cm height; and
    (iii) an Izod impact resistance value at −20° C. from 7.5 to 10.6 kJ/m$^2$, according to ISO method 180/1A.

2. The polypropylene composition of claim 1 wherein the weight ratio of component (c) to component (b) is at least 1.4, and the polypropylene composition has a melt flow ranging from 0.1 to 5 g/10 min.

3. The polypropylene composition of claim 2 having a melt flow ranging from 1.3 to 4 g/10 min.

4. A battery case comprising the composition of claim 1.

5. A polymerization process for preparing a polypropylene composition comprising, percent by weight:
   a) 70 to 77 wt. % of a crystalline propylene polymer comprising an amount of isotactic pentads (mmmm) higher than 97.5 molar %, measured by $^{13}$C-NMR using a fraction insoluble in xylene at 25° C., and having a polydispersity index ranging from 5 to 10;
   b) 9 to 12 wt. % of an elastomeric copolymer of ethylene and propylene, wherein the elastomeric copolymer of ethylene and propylene has:
      (i) an ethylene content ranging from 30 to 70%, and
      (ii) the polymer fraction soluble in xylene at ambient temperature, has an intrinsic viscosity value ranging from 3.5 to 4 dl/g; and
   c) 16 to 20 wt % of a polyethylene homopolymer comprising an intrinsic viscosity value ranging from 2.0 to 2.7 dl/g;
   wherein the polypropylene composition has:
      (i) a flexural modulus value ranging from 1400 to 1600 MPa, according to ISO method 178;
      (ii) a stress-whitening resistance values corresponding to a diameter of a whitened area of at most 1.7 cm caused by a ram falling from a 76 cm height, and a diameter of a whitened area of at most 1.2 cm caused by a ram falling from a 20 cm height; and
      (iii) an Izod impact resistance value at −20° C. from 7.5 to 10.6 kJ/m$^2$, according to ISO method 180/1A, and
   wherein the process comprises the steps of:
      polymerizing the crystalline propylene polymer,
      polymerizing the elastomeric copolymer of ethylene and propylene, and
      polymerizing the polyethyethylene homopolymer
      in at least three sequential polymerization stages, wherein the crystalline propylene polymer, the elastomeric copolymer of ethylene and propylene, and the polyethylene are prepared in separate, subsequent stages; the process further comprising each stage operating in presence of a polymeric material formed, and a polyethylene homopolymer are prepared in separate, subsequent stages; the process further comprising each stage operating in presence of a polymeric material formed, and a catalyst used, in an immediately preceding polymerization stage, except for the first polymerizing step,
         wherein the catalyst comprises a catalyst component, the catalyst component comprising an electron-donor component, wherein the electron-donor component comprises a succinate of formula (I) or formula (II):

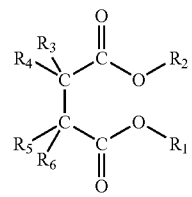

(I)

wherein
   $R_1$ and $R_2$, equal to, or different from each other, are a $C_1$-$C_{20}$ linear or branched alkyl, alkenyl, cycloalkyl, aryl, arylalkyl or alkylaryl group, optionally comprising at least one hoteroatom;
   $R_3$-$R_6$, equal to, or different from each other, are hydrogen or a $C_1$-$C_{20}$ linear or branched alkyl, alkenyl, cycloalkyl, aryl, arylalkyl or alkylaryl group, optionally comprising at least one heteroatom, wherein $R_3$-$R_6$ joined to a same carbon atom arc optionally joined to form a cycle; with the proviso that when $R_3$-$R_5$ are contemporaneously hydrogen, $R_6$ is selected from primary branched, secondary or tertiary alkyl groups, cycloalkyl, aryl, arylalkyl, or alkylaryl groups comprising from 3 to 20 carbon atoms; or

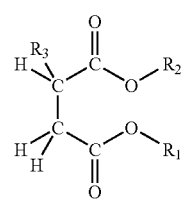

(II)

wherein
   $R_1$ and $R_2$, equal to, or different from each other, are a $C_1$-$C_{20}$ linear or branched alkyl, alkenyl, cycloalkyl, aryl, arylalkyl or alkylaryl group, optionally comprising at least one heteroatom, and
   $R_3$ is a linear alkyl group comprising at least four carbon atoms, optionally comprising at least one heteroatom.

\* \* \* \* \*